United States Patent
Kao et al.

(10) Patent No.: US 9,910,304 B2
(45) Date of Patent: Mar. 6, 2018

(54) THREE DIMENSIONAL CURATIVE DISPLAY APPARATUS AND METHOD FOR FABRICATING THE SAME

(71) Applicants: Interface Optoelectronics (ShenZhen) Co., Ltd., Shenzhen (CN); General Interface Solution Limited, Miaoli County (TW)

(72) Inventors: Chen-Wei Kao, Guangdong (CN); Chang-Hua Tsao, Guangdong (CN)

(73) Assignees: INTERFACE OPTOELECTRONICS (SHENZHEN) CO., LTD., Shenzhen (CN); GENERAL INTERFACE SOLUTION LIMITED, Miaoli County (TW)

( * ) Notice: Subject to any disclaimer, the term of this patent is extended or adjusted under 35 U.S.C. 154(b) by 254 days.

(21) Appl. No.: 14/951,502

(22) Filed: Nov. 25, 2015

(65) Prior Publication Data

US 2017/0059917 A1   Mar. 2, 2017

(30) Foreign Application Priority Data

Aug. 31, 2015  (CN) .......................... 2015 1 0549628

(51) Int. Cl.
*G02F 1/1333* (2006.01)

(52) U.S. Cl.
CPC .. *G02F 1/133305* (2013.01); *G02F 1/133308* (2013.01); *G02F 2202/28* (2013.01)

(58) Field of Classification Search
CPC ..................... G02F 1/133615; G02B 6/0068
See application file for complete search history.

(56) References Cited

U.S. PATENT DOCUMENTS

| 2008/0223708 A1* | 9/2008 | Joo ..................... H04M 1/0202 200/600 |
| 2016/0066440 A1* | 3/2016 | Choi .................... G06F 1/1637 361/679.3 |

* cited by examiner

*Primary Examiner* — Phu Vu
(74) *Attorney, Agent, or Firm* — CKC & Partners Co., Ltd.

(57) ABSTRACT

A display apparatus with a three dimensional curvature cover lens includes a curved protect layer, a shaping layer, a first adhesive layer, a liquid crystal display module and an interlayer. The first adhesive layer is disposed between the curved protect layer and the shaping layer, and used to adhere the curved protect layer and the shaping layer. The interlayer is bonded in-between the shaping layer and the liquid crystal display module.

16 Claims, 3 Drawing Sheets

THREE DIMENSIONAL CURATIVE DISPLAY APPARATUS AND METHOD FOR FABRICATING THE SAME

RELATED APPLICATIONS

This application claims priority to Chinese Application Serial Number 201510549628.1, filed Aug. 31, 2015, which is herein incorporated by reference.

BACKGROUND

Field of Invention

The present disclosure relates to a display apparatus. More particularly, the present disclosure relates to a display apparatus with a three dimensional curvature for vehicle.

Description of Related Art

A conventional three dimensional curvature display apparatus usually includes a stacked structure forming by a liquid crystal display module covered with a curve-shaped protective cover lens. However, attaching an adhesive layer between the curve-shaped protective cover lens and the liquid crystal display module usually is limited by geometry mismatching between the curve-shaped surface of the protective cover lens and the flat-shaped surface of the liquid crystal display module, such that the attachment between the protective cover lens and the liquid crystal display module is prone to be partly unsealed. In order to solve aforesaid problem, a shaping bracket (layer) with specific geometry would be inserted between the curve-shaped protective cover lens and the liquid crystal display module, and a adhesive layer would be poured into a gap between the shaping bracket and the liquid crystal display module to adhere both of them together, in which the shaping bracket has two surfaces with different shape, opposite to each other. The shape of the surfaces are respectively corresponded to match the curve-shaped surface of the protective cover lens and the flat-shaped surface of the liquid crystal display module, so that the surfaces of the shaping bracket could be hermetically attached with the corresponding surface of the protective cover lens and the liquid crystal display module respectively, to decrease or avoid the attachment being partly unsealed.

Although, inserting the shaping bracket and pouring the adhesive layer could fortify the attachment between the protective cover lens and the liquid crystal display module, and the adhesive layer could be much close-fitting to seal them. The aforesaid adhesive layer usually adopts an adhesive with lower coefficient of viscosity, such as hydrogel or gelatinous adhesive, so that the adhesive layer can be poured into and filled up the gap between the protective cover lens and the liquid crystal display module more easily. Then, the adhesive layer is cured to adhere the protective cover lens and the liquid crystal display module together. Yet, due to the adhesive layer has lower coefficient of viscosity before the adhesive layer being cured or under the curing process, the adhesive layer is prone to leave the gap between the protective cover lens and the liquid crystal display module under the gravity force. Thereupon, the adhesive layer may penetrate into the space between the shaping bracket and the liquid crystal display module, which would make an impact on the display function of the three dimensional curvature display apparatus. In addition, the adhesive layer may react with the surface of the liquid crystal display apparatus, so that the liquid crystal display apparatus could be further damaged.

Consequently, the available structure of a three dimensional curvature display apparatus, as described above, apparently exists with inconvenience and defect, which needs further improvement. To deal with aforesaid problem, practitioners of ordinary skill in the art have striven to attain a solution, still lacks a suitable solution to be developed. Therefore, to deal with aforesaid problem effectively is an important subject of research and development, and also a desired improvement in the art.

SUMMARY

The present disclosure provides a three dimensional curvature display apparatus. The three dimensional curvature display apparatus includes a curved protective layer, a shaping layer, a first adhesive layer, a liquid crystal display module and an interlayer. The first adhesive layer is disposed between the curved protective layer and the shaping layer. The first adhesive layer is configured to attach the curved protective layer and the shaping layer. The interlayer is bonded between the shaping layer and the liquid crystal display module.

The present disclosure provides a method for fabricating a three dimensions curvatural display apparatus. The method includes bonding an interlayer on a liquid crystal display module, bonding a shaping layer on the interlayer, placing a curved protective layer on the shaping layer and adhering the shaping layer and the curved protective layer.

It is to be understood that both the foregoing general description and the following detailed description are by examples, and are intended to provide further explanation of the invention as claimed.

BRIEF DESCRIPTION OF THE DRAWINGS

The disclosure can be more fully understood by reading the following detailed description of the embodiment, with reference made to the accompanying drawings as follows.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION

Figure 1:
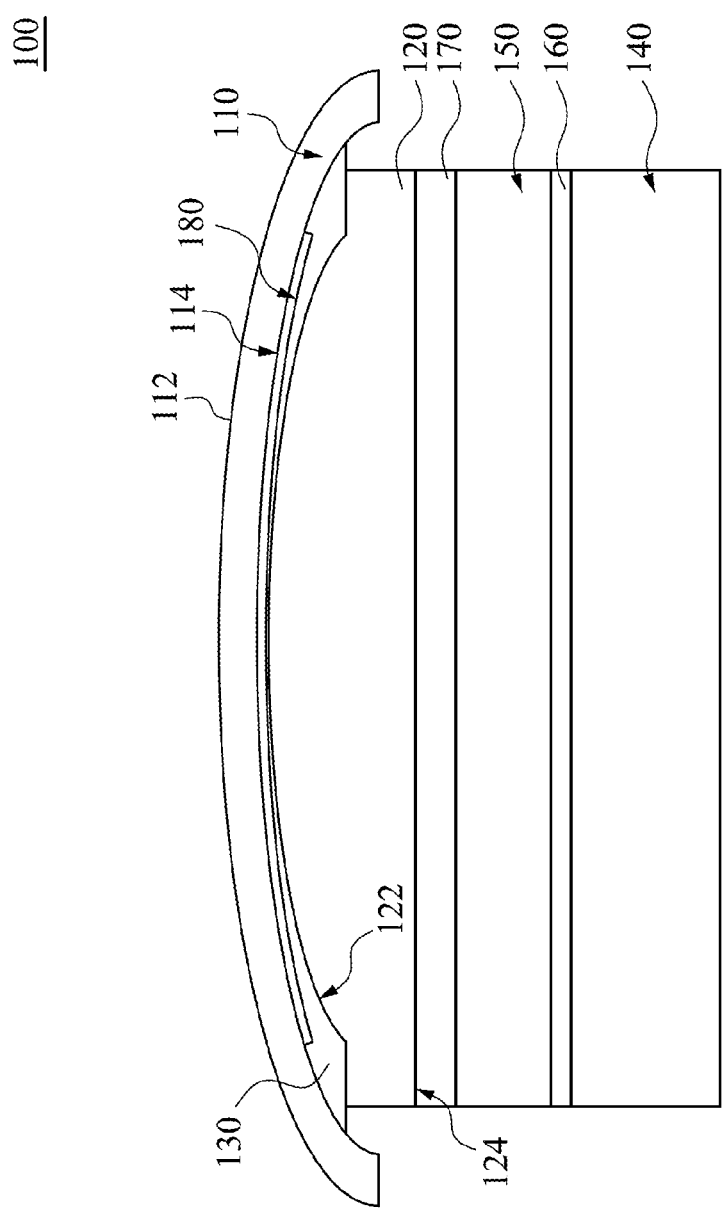
FIG. 1 is a longitudinal sectional view of a three dimensional curvature display apparatus according to an embodiment of the present disclosure.

Reference will now be made in detail to the present embodiments of the invention, examples of which are illustrated in the accompanying drawings. Wherever possible, the same reference numbers are used in the drawings and the description to refer to the same or like parts.

It will be understood that when an element is referred to as being "on" another element, it can be directly on the other element or intervening elements may be present therebetween. In contrast, when an element is referred to as being "directly on" another element, there are no intervening elements present.

FIG. 1 illustrates a longitudinal sectional view of a three dimensional curvature display apparatus 100 according to an embodiment of the present disclosure. As shown in FIG. 1, the three dimensional curvature display apparatus 100 includes a curved protective layer 110, a shaping layer 120, a first adhesive layer 130, a liquid crystal display module 140, and an interlayer 150. In some embodiment, the shaping layer 120 can be made with metal, plastic or other suitable material. In some embodiments, forging molding, cast molding, cutting molding or injection molding process, can form the shaping layer 120. The first adhesive layer 130 is disposed between the curved protective layer 110 and the shaping layer 120, the first adhesive layer 130 is configured to attach or bond the curved protective layer 110 and the shaping layer 120 together. In some embodiments, the first adhesive layer 130 can be a hydrogel or a gelatinous adhesive required a curing process. The first adhesive layer 130 can be cured into an adhesive layer adhering adjoining layers of the first adhesive layer 130 after curing process. The pouring and curing of the first adhesive layer 130 can fill up a gap between the curved protective layer 110 and the shaping layer 120, moreover, the first adhesive layer 130 can attach and bond the curved protective layer 110 and the shaping layer 120 together, the detail manufacturing process would be described later. In some embodiments, the first adhesive layer 130 can be an optical clear resin (OCR) or other suitable transparent adhesive layer. The liquid crystal display module 140 is disposed under the shaping layer 120. The interlayer 150 is bonded between the shaping layer 120 and the liquid crystal display module 140. In some embodiments, the interlayer 150 is disposed over a surface of the liquid crystal display module 140, and a vertical projection of the interlayer 150 on a surface of the liquid crystal display module 140 is at least covered or overlapped the surface of the liquid crystal display module 140. Therefore, the interlayer 150 can decrease or avoid the risk of the incompletely cured first adhesive layer 130 penetrating into a surface of the liquid crystal display module 140, or moreover, inside the liquid crystal display module 140 during the manufacturing process. In some embodiments, the interlayer 150 can be a reinforced glass or other suitable transparent materials. In some embodiments, the thickness of the interlayer 150 is between 0.1 mm to 1.0 mm.

It should be noted that, "the interlayer 150 is at least covered the surface of the liquid crystal display module 140", as described herein, may include few situations, for example, the boundary of the interlayer 150 extends out from boundary of the liquid crystal display module 140, the boundary of the interlayer 150 aligns with boundary of the liquid crystal display module 140 or at least a portion of the boundary of the interlayer 150 extends out from boundary of the liquid crystal display module 140 and remained portion of the boundary of the interlayer 150 aligns with boundary of the liquid crystal display module 140, moreover, sometimes a portion of the boundary of the interlayer 150 may be located inner than the boundary of the liquid crystal display module 140. It should be understood that, aspect of the interlayer 150, described above, is only an example, and not intended to limit the present disclosure, could be adjusted to actual demand by those skilled in the art. That is to say, prerequisite of the interlayer 150 is to cover a surface of the liquid crystal display module 140, and prevent the first adhesive layer 130 penetrating into the liquid crystal display module 140.

Owing to the gap between the curved protective layer 110 and the shaping layer 120 awaited the first adhesive layer 130 to fill in is not a flat-shaped space, the first adhesive layer 130 needs to be poured into the gap to manufacture the three dimensional curvature display apparatus 100. Therefore, the first adhesive layer 130 usually adopts a hydrogel having greater flowability (or mobility) before being cured, such that the first adhesive layer 130 can easily fill up the gap between the curved protective layer 110 and the shaping layer 120 before being cured or under the curing process. Therefore, under the gravitational force, the first adhesive layer 130 having greater mobility before being cured or under the curing process can be prone to flow along the direction of the gravitational force and penetrate into the surface of the liquid crystal display module 140, or inside the liquid crystal display module 140. In the meanwhile, the interlayer 150 of the three dimensional curvature display apparatus 100 can prevent the liquid crystal display module 140 being penetrated by the first adhesive layer, in the manner of covering the surface of the liquid crystal display module 140 with the interlayer 150. That is, the surface of the liquid crystal display module 140 is being protected by the means of covering the interlayer 150 onto the liquid crystal display module 140, which can decrease or prevent impact of the first adhesive layer 130 on the liquid crystal display module 140 effectively, before the first adhesive layer 130 is cured or under curing process. Furthermore, the interlayer 150 can decrease or prevent the risk of the first adhesive layer reacting with the surface of the liquid display module 140, which may induce further damage on the liquid display module 140.

As shown in FIG. 1, in some embodiments of the present disclosure, the three dimensional curvature display apparatus 100 further includes a second adhesive layer 160 and a third adhesive layer 170. The second adhesive layer 160 is disposed between the interlayer 150 and the liquid crystal display module 140. The second adhesive layer 160 is configured to attach the interlayer 150 and the liquid crystal display module 140. In some embodiments, the interlayer 150 can be fully laminating to the liquid crystal display module 140 with the second adhesive layer 160. The third adhesive layer 170 is disposed between the interlayer 150 and the shaping layer 120. The third adhesive layer 170 is configured to attach the interlayer 150 and the shaping layer 120.

In some embodiments, the second adhesive layer 160 and the third adhesive layer 170 can be optical clear adhesive (OCA), attachment gasket or other suitable adhering material. In some embodiments, the second adhesive layer 160 and the third adhesive layer 170 can be foam tape, polycarbonate, polymethylmethacrylate (PMMA) or combination thereof. It should be understood that, aspect of the second adhesive layer 160 and the third adhesive layer 170, described above, is only an example, and not intended to limit the present disclosure, the second adhesive layer 160 and the third adhesive layer 170 could be any other aspect of adhesive material, those skilled in the art can follow the actual demand to opt suitable material of the second adhesive layer 160 and the third adhesive layer 170. That is, the second adhesive layer 160 and the third adhesive layer 170 can attach to the interlayer 150, respectively adhere the liquid crystal display module 140 and the shaping layer 120, and let the light emitting from the liquid crystal display module 140 reach the curved protective layer, would be a proper option for the second adhesive layer 160 and the third adhesive layer 170.

In some embodiments, the three dimensional curvature display apparatus 100 further includes a touch sensing module 180, disposed between the curved protective layer 110 and the first adhesive layer 130. The touch sensing module 180 is configured to detect and receive motions or gestures of a user working on the curved protective layer 110. In some embodiments, the touch sensing module 180 can include touch sensing patterns and a transparent conductive film (not shown). In some embodiments, the touch sensing module 180 can include touch sensing patterns and a nano-structure metal mesh (not shown). In some embodiments, material of the touch sensing module 180 can be indium tin oxide (ITO), silver or other suitable material.

Referring to FIG. 1, in some embodiments of the present disclosure, the curved protective layer 110 has a first curved surface 112 and a second curved surface 114 opposite to each other. The first curved surface 112 is a surface of the curved protective layer 110 away from the shaping layer 120. The first curved surface 112 is configured to protect the three dimensional curvature display apparatus 100. The second curved surface 114 faces toward the shaping layer 120. In some embodiments, the touch sensing module 180 is disposed on at least part of the second curved surface 114. The shaping layer 120 has a third curved surface 122 and a flat surface 124 opposite to each other. The third curved surface 122 faces toward the curved protective layer 110. In some embodiments, the shaping layer 120 may further have a border region surrounding the third curved surface 122. The flat surface 124 faces toward the interlayer 150.

In some embodiments of the present disclosure, the first curved surface 112, the second curved surface 114, and a curved portion of the third curved surface 122 are bent away from the flat surface 124 of the shaping layer 120. That is, the center area of the first curved surface 112, the second curved surface 114 and the third curved surface 122 compare with the border area, the center area of the first curved surface 112, the second curved surface 114 and the third curved surface 122 have greater distance related to the flat surface 124, and the border area have smaller distance related to the flat surface 124. The first curved surface 112, the second curved surface 114, and a curved portion of the third curved surface 122 respectively has a first curvature, second curvature and a third curvature. In some embodiments, the second curvature is equal to at least part of the third curvature, so that light or images leaving the shaping layer 120 may access the curved protective layer 110, and be transmitted inside the curved protective layer 110 with less distortion and malformation. In other embodiments of the present disclosure, the second curvature is different from the third curvature. In some embodiments, the second curvature is equal to the first curvature, so that light or images may be transmitted through the curved protective layer 110 with less distortion and malformation. In other embodiments of the present disclosure, the first curvature is different from the second curvature, so that light or images may be transmitted through the curved protective layer 110, then being emitted along with various imaging effect.

Figure 2:
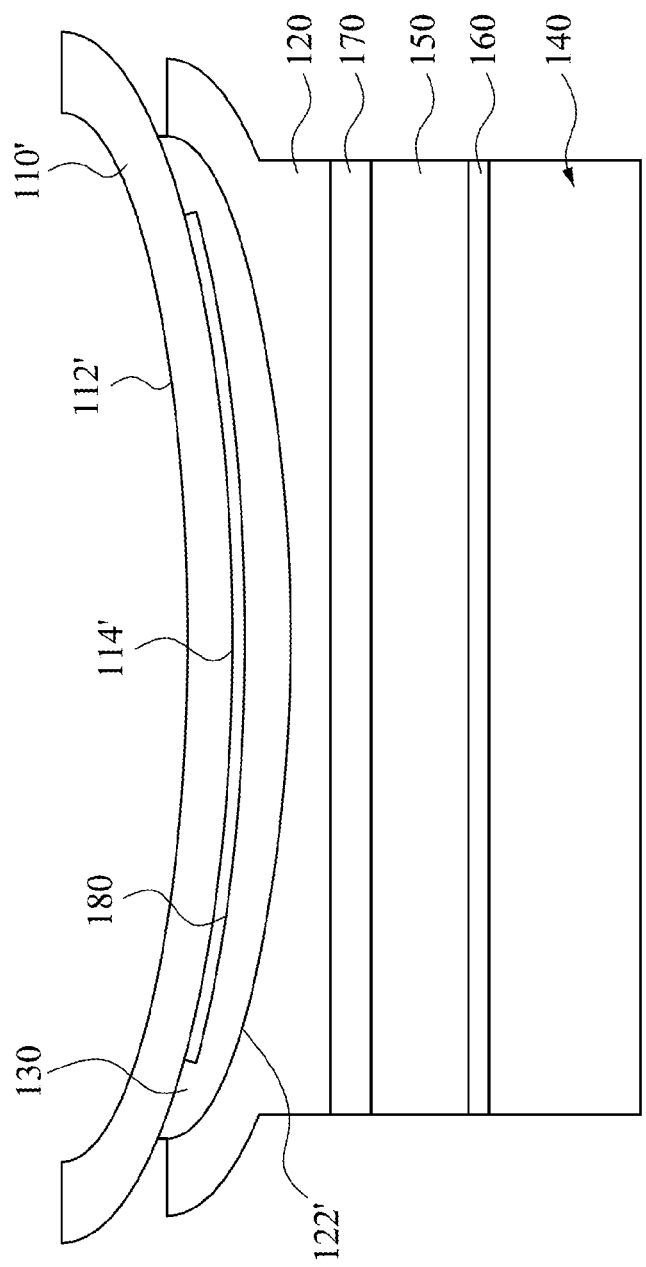
FIG. 2 is a longitudinal sectional view of a three dimensional curvature display apparatus according to another embodiment of the present disclosure.

FIG. 2 illustrates a longitudinal sectional view of a three dimensional curvature display apparatus 200 according to another embodiment of the present disclosure. In some embodiments of the present disclosure, the first curved surface 112', the second curved surface 114', and a curved portion of the third curved surface 122' of the three dimensional curvature display apparatus 200 are bent toward the flat surface 124 of the shaping layer 120. That is, the center area of the first curved surface 112', the second curved surface 114' and the third curved surface 122' comparing with the border area is contrary to the three dimensional curvature display apparatus 100. The center area of the first curved surface 112', the second curved surface 114' and the third curved surface 122' have smaller distance related to the flat surface 124, and the border area have greater distance related to the flat surface 124. The first curved surface 112', the second curved surface 114', and a curved portion of the third curved surface 122' respectively has a first curvature, second curvature and a third curvature. In some embodiments, the second curvature is equal to at least part of the third curvature, so that light or images leaving the shaping layer 120 may access the curved protective layer 110, and be transmitted inside the curved protective layer 110 with less distortion and malformation. In other embodiments of the present disclosure, the second curvature is different from the third curvature. In some embodiments, the second curvature is equal to the first curvature, so that light or images may be transmitted through the curved protective layer 110 with less distortion and malformation. In other embodiments of the present disclosure, the first curvature is different from the second curvature, so that light or images may be transmitted through the curved protective layer 110, then being emitted along with various imaging effect.

Figure 3:
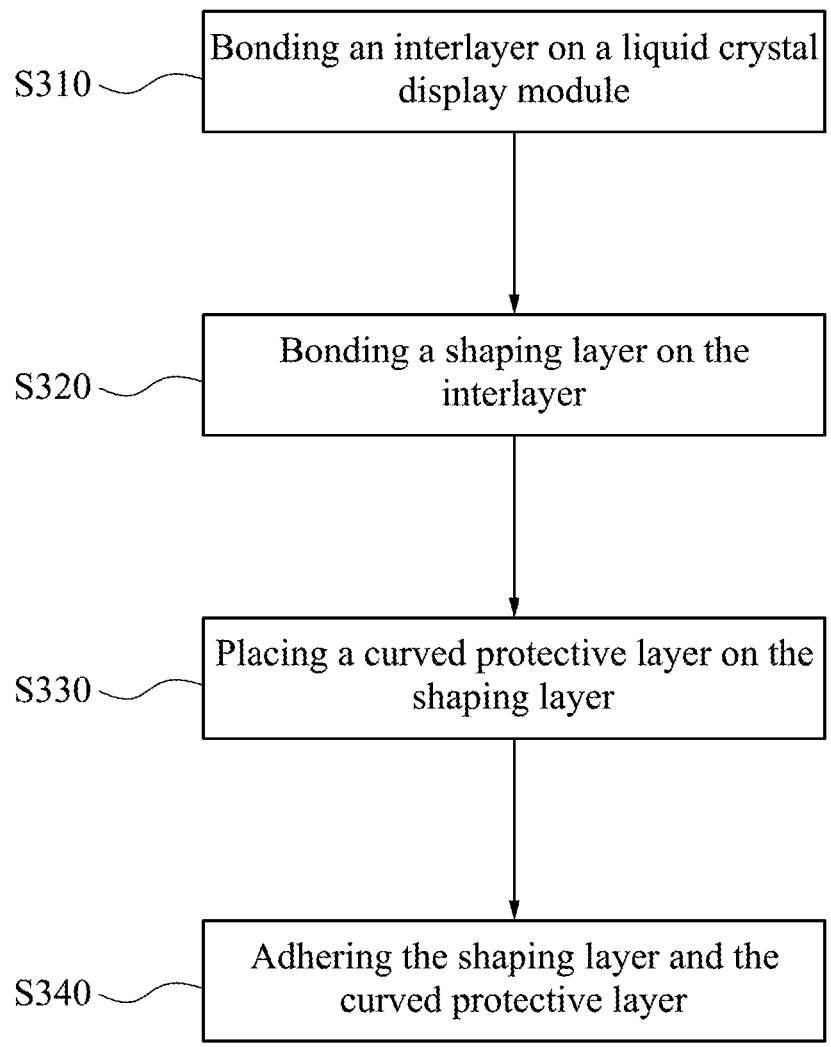
FIG. 3 is a flow chart of a method for fabricating the three dimensional curvature display apparatus according to an embodiment of the present disclosure.

FIG. 3 illustrates a flow chart of a method 300 for fabricating the three dimensional curvature display apparatus according to an embodiment of the present disclosure. As shown in FIG. 3, the method 300 for fabricating the three dimensional curvature display apparatus is provided, which includes step 310 to step 340. In step 310, an interlayer is bonded on a liquid crystal display module. In some embodiments, the interlayer bonded on the liquid crystal display module may cover at least a surface of the liquid crystal display module facing toward the interlayer. In step 320, a shaping layer is bonded on the interlayer. In step 330, a curved protective layer is placed on the shaping layer. The curved protective layer is configured to protect the rest portion of the three dimensional curvature display apparatus underlying. In step 340, adhering the shaping layer and the curved protective layer. In some embodiments, step 340 includes pouring a first adhesive layer between the shaping layer and the curved protective layer, and curing the first adhesive layer.

Owing to the method 300 for fabricating a three dimensional curvature display apparatus additionally inserts the interlayer between the shaping layer and the liquid crystal display module, so that the method 300 can effectively prevent the first adhesive layer penetrating into other portion of the three dimensional curvature display apparatus underlying, before the first adhesive layer being fully cured. To decrease or avoid the risk of damaging the three dimensional curvature display apparatus.

In some embodiments, step 330 can include forming a touch sensing layer on a surface of the curved protective layer facing toward the shaping layer. In some embodiments, step 310 include utilizing a second adhesive layer, in which the second adhesive layer is attached between the liquid crystal display module and the interlayer. In some embodiments, step 320 includes utilizing a third adhesive layer, in which the third adhesive layer attached between the shaping layer and the interlayer.

Summarized from the above, the present disclosure provides a three dimensional curvature display apparatus, including a curved protective layer, a shaping layer, a first adhesive layer, a liquid crystal display module and an interlayer. The first adhesive layer is disposed between the curved protective layer and the shaping layer. The first adhesive layer is configured to attach the curved protective layer and the shaping layer. The interlayer is bonded between the shaping layer and the liquid crystal display module. The interlayer can cover a surface of the liquid crystal display module, to avoid or decrease the risk that the first adhesive layer without being fully cured penetrates into the surface of the liquid crystal display module, or even inside the liquid crystal display module.

Although some embodiments of the present disclosure and their advantages have been described in detail, it should be understood that various changes, substitutions, and alterations can be made herein without departing from the spirit and scope of the disclosure as defined by the appended claims. For example, it will be readily understood by those skilled in the art that many of the features, functions, processes, and materials described herein may be varied while remaining within the scope of the present disclosure. Moreover, the scope of the present application is not intended to be limited to the particular embodiments of the process, machine, fabricate, composition of matter, means, methods, and steps described in the specification. As one of ordinary skill in the art will readily appreciate from the disclosure of the present disclosure, processes, machines, fabricate, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, fabricate, compositions of matter, means, methods, or steps.

What is claimed is:

1. A three dimensional curvature display apparatus, comprising:
   a curved protective layer;
   a shaping layer;
   a first adhesive layer disposed between the curved protective layer and the shaping layer, the first adhesive layer being configured to attach the curved protective layer and the shaping layer;
   a liquid crystal display module; and
   an interlayer bonded between the shaping layer and the liquid crystal display module,
   wherein the shaping layer has a third curved surface facing toward the curved protective layer and a flat surface facing toward the interlayer.

2. The three dimensional curvature display apparatus of claim 1, wherein the first adhesive layer is an optical clear resin (OCR).

3. The three dimensional curvature display apparatus of claim 1, further comprising:
   a second adhesive layer disposed between the interlayer and the liquid crystal display module, the second adhesive layer being configured to attach the interlayer and the liquid crystal display module; and
   a third adhesive layer disposed between the interlayer and the shaping layer, the third adhesive layer being configured to attach the interlayer and the shaping layer.

4. The three dimensional curvature display apparatus of claim 3, wherein the second adhesive layer and the third adhesive layer are optical clear adhesive or attachment gasket.

5. The three dimensional curvature display apparatus of claim 1, further comprising a touch sensing module disposed between the curved protective layer and the first adhesive layer.

6. The three dimensional curvature display apparatus of claim 1, wherein the curved protective layer has a first curved surface and a second curved surface opposite to each other, the second curved surface faces toward the shaping layer.

7. The three dimensional curvature display apparatus of claim 6, wherein the first curved surface, the second curved surface, and a curved portion of the third curved surface are bent away from the flat surface of the shaping layer.

8. The three dimensional curvature display apparatus of claim 7, wherein the curvature of the second curved surface is equal to the curvature of the curved portion of the third curved surface.

9. The three dimensional curvature display apparatus of claim 6, wherein the first curved surface, the second curved surface, and a curved portion of the third curved surface are bent toward the flat surface of the shaping layer.

10. The three dimensional curvature display apparatus of claim 9, wherein the curvature of the second curved surface is equal to the curvature of the curved portion of the third curved surface.

11. The three dimensional curvature display apparatus of claim 1, wherein a vertical projection of the interlayer on a surface of the liquid crystal display module is at least covered the surface of the liquid crystal display module.

12. A method for fabricating a three dimensional curvature display apparatus, comprising:
   bonding an interlayer on a liquid crystal display module;
   bonding a shaping layer on the interlayer;
   placing a curved protective layer on the shaping layer; and
   adhering the shaping layer and the curved protective layer,
   wherein the shaping layer has a curved surface facing toward the curved protective layer and a flat surface facing toward the interlayer.

13. The method of claim 12, wherein the adhering of the shaping layer and the curved protective layer comprises:
   pouring a first adhesive layer between the shaping layer and the curved protective layer; and
   curing the first adhesive layer.

14. The method of claim 12, wherein the placing of the curved protective layer comprises forming a touch sensing layer on a surface of the curved protective layer facing toward the shaping layer.

15. The method of claim 12, wherein the bonding of the interlayer on the liquid crystal display module comprises utilizing a second adhesive layer, attached between the liquid crystal display module and the interlayer.

16. The method of claim 12, wherein bonding the shaping layer on the interlayer comprises utilizing a third adhesive layer, attached between the shaping layer and the interlayer.

* * * * *